(12) United States Patent
Zohar et al.

(10) Patent No.: US 8,949,980 B2
(45) Date of Patent: Feb. 3, 2015

(54) METHOD AND SYSTEM FOR WEBSITE DATA ACCESS MONITORING

(75) Inventors: Meir Zohar, Givat Shmuel (IL); Nitzan Ben-Zvi, Hogla (IL)

(73) Assignee: Exelate, New York, NY (US)

( * ) Notice: Subject to any disclaimer, the term of this patent is extended or adjusted under 35 U.S.C. 154(b) by 225 days.

(21) Appl. No.: 13/012,077

(22) Filed: Jan. 24, 2011

(65) Prior Publication Data

US 2011/0209216 A1 Aug. 25, 2011

Related U.S. Application Data

(60) Provisional application No. 61/297,862, filed on Jan. 25, 2010.

(51) Int. Cl.
| | |
|---|---|
| G06F 21/00 | (2013.01) |
| G06Q 30/02 | (2012.01) |
| G06F 17/30 | (2006.01) |
| H04L 29/06 | (2006.01) |

(52) U.S. Cl.
CPC ......... *G06Q 30/02* (2013.01); *G06F 17/30867* (2013.01); *H04L 63/1416* (2013.01)
USPC .......................................... 726/22; 709/225

(58) Field of Classification Search
USPC ....................................................... 726/22
See application file for complete search history.

(56) References Cited

U.S. PATENT DOCUMENTS

| | | |
|---|---|---|
| 5,848,396 A | 12/1998 | Gerace |
| 5,948,061 A | 9/1999 | Merriman et al. |
| 5,991,735 A | 11/1999 | Gerace |
| 6,026,368 A | 2/2000 | Brown et al. |
| 6,134,532 A | 10/2000 | Lazarus et al. |
| 6,594,691 B1 | 7/2003 | McCollum et al. |
| 6,662,215 B1 | 12/2003 | Moskowitz et al. |
| 6,925,440 B1 | 8/2005 | Shkedi |
| 6,973,436 B1 | 12/2005 | Shkedi |
| 6,983,379 B1 | 1/2006 | Spalink et al. |
| 7,039,599 B2 | 5/2006 | Merriman et al. |
| 7,062,510 B1 | 6/2006 | Eldering |
| 7,072,853 B2 | 7/2006 | Shkedi |
| 7,089,195 B2 | 8/2006 | Rosenberg |
| 7,162,522 B2 | 1/2007 | Adar et al. |
| 7,428,493 B2 | 9/2008 | Shkedi |
| 7,454,364 B2 | 11/2008 | Shkedi |
| 7,496,943 B1 | 2/2009 | Goldberg et al. |

(Continued)

OTHER PUBLICATIONS

Soltani, A. et al., "Flash Cookies and Privacy", 2009, Summer Undergraduate Program in Engineering Research at Berkeley (SUPERB) 2009, p. 158-163.*

(Continued)

*Primary Examiner* — Jason K. Gee
*Assistant Examiner* — Maung Lwin
(74) *Attorney, Agent, or Firm* — Venable LLP; Jeffri A. Kaminski

(57) ABSTRACT

In a network comprising number of web sites and at least one simulator web page calls are simulated or monitored and the response to the calls, including content, re-directed calls and cookies are examined in order to identify whether the content of cookies has been written or modified illegally. Illegal modification of content of cookies is referred to as writing of data by a Buyer in cookies of a User that was directed to the Buyer by a Data Publisher, without the consent of the Data Publisher. In some embodiments when illegal cookies are identified an alert may be issued to a user.

19 Claims, 8 Drawing Sheets

(56) References Cited

U.S. PATENT DOCUMENTS

| | | | |
|---|---|---|---|
| 7,533,012 B2 * | 5/2009 | Walsh et al. .................... 703/21 |
| 7,617,122 B2 | 11/2009 | Kumar et al. |
| 7,991,800 B2 | 8/2011 | Lawrence et al. |
| 8,019,777 B2 | 9/2011 | Hauser |
| 8,024,323 B1 | 9/2011 | Nayfeh |
| 8,027,879 B2 | 9/2011 | Ramer et al. |
| 8,073,738 B2 | 12/2011 | Protheroe et al. |
| 8,108,245 B1 | 1/2012 | Hosea et al. |
| 8,234,166 B2 | 7/2012 | Filice et al. |
| 8,296,643 B1 | 10/2012 | Vasilik |
| 8,321,273 B2 | 11/2012 | Briggs |
| 2002/0166258 A1 | 11/2002 | Posa |
| 2003/0014304 A1 | 1/2003 | Calvert et al. |
| 2003/0033196 A1 | 2/2003 | Tomlin |
| 2003/0036949 A1 | 2/2003 | Kaddeche et al. |
| 2003/0088485 A1 | 5/2003 | Feinberg |
| 2003/0135460 A1 | 7/2003 | Talegon |
| 2003/0167212 A1 | 9/2003 | Monteverde |
| 2004/0003036 A1 | 1/2004 | Eagle et al. |
| 2004/0015397 A1 | 1/2004 | Barry et al. |
| 2004/0024632 A1 | 2/2004 | Perry |
| 2004/0117460 A1 | 6/2004 | Walsh et al. |
| 2004/0117486 A1 * | 6/2004 | Bourne et al. ................ 709/228 |
| 2004/0199397 A1 | 10/2004 | Dresden |
| 2005/0165643 A1 | 7/2005 | Wilson et al. |
| 2005/0166233 A1 | 7/2005 | Beyda et al. |
| 2005/0187818 A1 | 8/2005 | Zito et al. |
| 2005/0193020 A1 | 9/2005 | Shkedi |
| 2005/0222901 A1 | 10/2005 | Agarwal et al. |
| 2005/0235030 A1 * | 10/2005 | Lauckhart et al. ............ 709/200 |
| 2005/0246736 A1 | 11/2005 | Beyda et al. |
| 2006/0026061 A1 | 2/2006 | Collins |
| 2006/0041562 A1 | 2/2006 | Paczkowski et al. |
| 2006/0059042 A1 | 3/2006 | Zohar |
| 2006/0212349 A1 | 9/2006 | Brady |
| 2006/0212350 A1 | 9/2006 | Ellis et al. |
| 2006/0242267 A1 | 10/2006 | Grossman |
| 2006/0282328 A1 | 12/2006 | Gerace et al. |
| 2007/0022009 A1 | 1/2007 | Cataldi et al. |
| 2007/0061195 A1 | 3/2007 | Liu et al. |
| 2007/0067215 A1 | 3/2007 | Agarwal et al. |
| 2007/0088609 A1 | 4/2007 | Reller et al. |
| 2007/0168506 A1 * | 7/2007 | Douglas et al. ............... 709/224 |
| 2007/0294401 A1 | 12/2007 | Shkedi |
| 2008/0010155 A1 | 1/2008 | Shkedi |
| 2008/0040175 A1 | 2/2008 | Dellovo |
| 2008/0183561 A1 | 7/2008 | Zohar et al. |
| 2008/0195462 A1 | 8/2008 | Magdon-Ismail et al. |
| 2008/0209037 A1 * | 8/2008 | Zernik et al. ................. 709/225 |
| 2008/0243531 A1 | 10/2008 | Hyder et al. |
| 2008/0243592 A1 | 10/2008 | Song et al. |
| 2008/0263627 A1 * | 10/2008 | Berteau et al. .................... 726/1 |
| 2008/0275980 A1 | 11/2008 | Hansen |
| 2009/0006363 A1 | 1/2009 | Canny et al. |
| 2009/0024546 A1 | 1/2009 | Ficcaglia et al. |
| 2009/0055332 A1 | 2/2009 | Lee |
| 2009/0063250 A1 | 3/2009 | Burgess et al. |
| 2009/0063268 A1 | 3/2009 | Burgess et al. |
| 2009/0106296 A1 * | 4/2009 | Sickmiller et al. ............ 707/102 |
| 2009/0125398 A1 | 5/2009 | Cochran et al. |
| 2009/0150126 A1 | 6/2009 | Sellamanickam et al. |
| 2009/0157494 A1 * | 6/2009 | Kirovski et al. ................ 705/14 |
| 2010/0082507 A1 | 4/2010 | Ganapathi et al. |
| 2010/0082808 A1 | 4/2010 | Vaynblat et al. |
| 2010/0088177 A1 | 4/2010 | Lu et al. |
| 2010/0100415 A1 * | 4/2010 | Plummer et al. ................ 705/10 |
| 2010/0179855 A1 | 7/2010 | Chen et al. |
| 2010/0228595 A1 | 9/2010 | Dempster et al. |
| 2010/0241510 A1 | 9/2010 | Zhang |
| 2010/0332426 A1 | 12/2010 | Van Bemmel |
| 2011/0125587 A1 | 5/2011 | Netzer et al. |
| 2011/0131099 A1 | 6/2011 | Shields et al. |
| 2011/0166927 A1 | 7/2011 | Bandi et al. |
| 2011/0173063 A1 | 7/2011 | Bhatia et al. |
| 2011/0173071 A1 | 7/2011 | Meyer et al. |
| 2011/0187717 A1 | 8/2011 | Jagannath et al. |
| 2011/0191169 A1 | 8/2011 | Cui et al. |
| 2011/0191170 A1 | 8/2011 | Zhang et al. |
| 2011/0191191 A1 | 8/2011 | Bax et al. |
| 2011/0208591 A1 | 8/2011 | Chen et al. |
| 2011/0218866 A1 | 9/2011 | Wilson |
| 2011/0231242 A1 | 9/2011 | Dilling et al. |
| 2011/0231244 A1 | 9/2011 | Bhatia et al. |
| 2011/0231245 A1 | 9/2011 | Bhatia et al. |
| 2011/0231246 A1 | 9/2011 | Bhatia et al. |
| 2011/0231253 A1 | 9/2011 | Crawford et al. |
| 2011/0238468 A1 | 9/2011 | Shen et al. |
| 2011/0246285 A1 | 10/2011 | Ratnaparkhi et al. |
| 2011/0258052 A1 | 10/2011 | Kakade et al. |
| 2011/0258054 A1 | 10/2011 | Pandey et al. |
| 2011/0270670 A1 | 11/2011 | Leathern |
| 2011/0270686 A1 | 11/2011 | Patwa et al. |
| 2011/0276391 A1 | 11/2011 | Hillard et al. |
| 2011/0282732 A1 | 11/2011 | Bax et al. |
| 2011/0282815 A1 | 11/2011 | Thomas |
| 2011/0310891 A1 | 12/2011 | Howe et al. |
| 2012/0004979 A1 | 1/2012 | Bhatia et al. |
| 2012/0004980 A1 | 1/2012 | Bhatia et al. |
| 2012/0004981 A1 | 1/2012 | Bhatia et al. |
| 2012/0010942 A1 | 1/2012 | Bax et al. |
| 2012/0022952 A1 | 1/2012 | Cetin et al. |
| 2012/0023043 A1 | 1/2012 | Cetin et al. |
| 2012/0036007 A1 | 2/2012 | Robertson et al. |
| 2012/0036008 A1 | 2/2012 | Robertson et al. |
| 2012/0066072 A1 | 3/2012 | Kanigsberg et al. |
| 2012/0078705 A1 | 3/2012 | Megdal |
| 2012/0078709 A1 | 3/2012 | Dunham et al. |
| 2012/0078711 A1 | 3/2012 | Mehta et al. |
| 2012/0084149 A1 | 4/2012 | Gaudiano et al. |
| 2012/0095845 A1 | 4/2012 | Shani |
| 2012/0095848 A1 | 4/2012 | Chan |
| 2012/0095985 A1 | 4/2012 | Shen et al. |
| 2012/0109745 A1 | 5/2012 | Bhamidipati |
| 2012/0116885 A1 | 5/2012 | Krishnamoorthy |
| 2012/0123851 A1 | 5/2012 | Bax et al. |
| 2012/0123859 A1 | 5/2012 | Gupta |
| 2012/0123863 A1 | 5/2012 | Kaul et al. |
| 2012/0150641 A1 | 6/2012 | Dobbs et al. |
| 2012/0166272 A1 | 6/2012 | Wiley et al. |
| 2012/0173326 A1 | 7/2012 | Tao et al. |
| 2012/0191528 A1 | 7/2012 | Bax et al. |
| 2012/0203642 A1 | 8/2012 | Park et al. |
| 2012/0253928 A1 | 10/2012 | Jackson et al. |
| 2012/0278158 A1 | 11/2012 | Farahat |
| 2012/0290403 A1 | 11/2012 | Galitzky et al. |

OTHER PUBLICATIONS

"Nielsen Bridges Online and Offline Behaviors with Innovative Cross-Platform Offering," The Nielsen Company, 2012, Retrieved from the internet: Aug. 14, 2012, pp. 1-2.

"Online Advertising," Fresh Patents.com, Retrieved from the internet: Nov. 20, 2012, pp. 1-2, http://tgs.freshpatents.com/Online-Advertising-bx1.phphttp://tgs.freshpatents.com/Online-Advertising-bx1.php , retrieved on Nov. 20, 2012.

LaRue, "eXelate, Nielsen Catalina Solutions Partner to Bring CPG Data Online," Adotas, Jan. 31, 2012, Retrieved from the internet: Aug. 14, 2012, pp. 1-2.

Lykou et al., "Sparse CCA using a Lasso with positivity constraints," Computational Statistics and Data Analysis, 2010 vol. 54, pp. 3144-3157.

Stage et al., "Measuring Similarity in Nearest Neighbor Imputation: Some New Alternatives," Proceedings of the Symposium on Statistics and Information technology in Forestry, 2003, pp. 1-6.

Witten et al., "A penalized matrix decomposition, with applications to sparse principal components and canonical correlation analysis," Biostatistics, 2009, vol. 10, No. 3, pp. 515-534.

* cited by examiner

US 8,949,980 B2

METHOD AND SYSTEM FOR WEBSITE DATA ACCESS MONITORING

CROSS REFERENCE TO RELATED APPLICATIONS

This application claims the benefit of U.S. Provisional Application Ser. No. 61/297,862, filed Jan. 25, 2010, which is hereby incorporated by reference in its entirety.

BACKGROUND

Advertising ("ad") Networks/Ad Agencies/Advertisers ("Buyers") are using targeting information to improve the performance of their campaigns that in many cases is measured based on conversion ratio. Conversion ratio may be the ratio between actual responses of users to the displayed advertisement content and the number of displayed advertisements. The buyers pay data publishers (e.g., owners of web sites) to tag users who visit their web sites with special cookies used for the targeting purposes while browsing into media publisher's sites. The payment for those services may be calculated by the number of tagged users or by the actual income associated with the cookies that were used.

By buying advertising spaces on the Data Publishers sites, the Buyers can tag the users browsed those sites and use this information in a later stage in the same way as described above. By doing that, the Buyers pay for user exposures and take advantage of the targeting data collected during this session without paying the Data Publishers for this information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
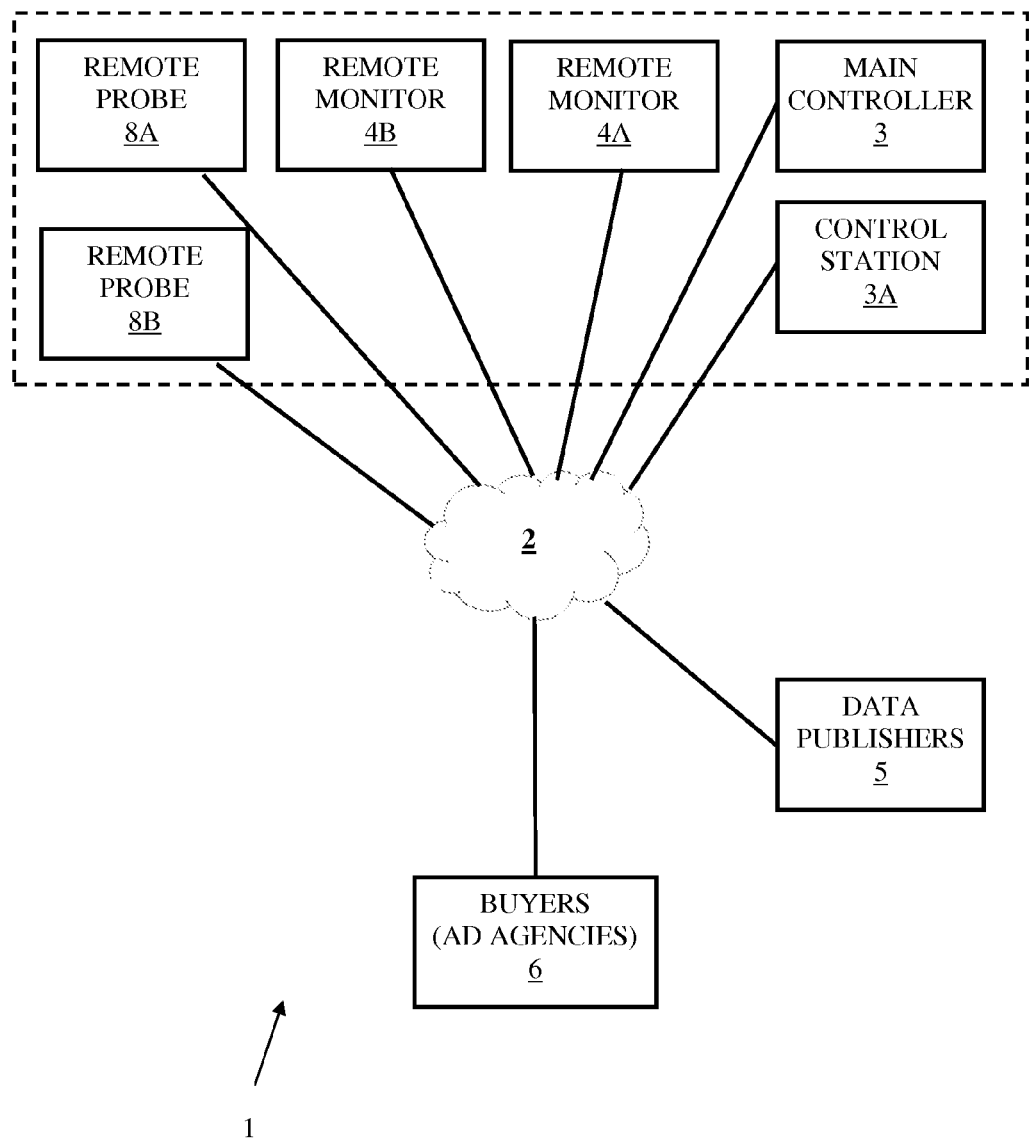
FIG. 1 is a schematic illustration of a distributed system with a central management center, according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A method and system for Web site access monitoring can be offered as a service to the data publishers, but this is not necessarily so. This service will include on going or on demand monitoring on the web pages and alerts (real time or according to other time plans) on illegal data writing. Illegal or unauthorized data writing will be referred to herein after as writing of data by a Buyer in cookies of a User that was directed to the Buyer by a Data Publisher, without the consent of the Data Publisher. Illegal or unauthorized cookies may be cookies including illegal data.

Methods and system according to embodiments of the present invention can monitor and detect illegal or unauthorized data writing. Such system and methods may detect and inform the Data Publisher (who is the owner of targeting information) about unauthorized data theft.

A system according to embodiments of the present invention may include one or more servers that are configured to simulate a request of Web User workstations (e.g., standard browser accessing web site via HTTP, HTTPS or other protocols) to access a monitored web site. According to other embodiments Web user workstations may include application/feature that may monitor their browsing activity, analyze it and report to a central unit. A monitored web site, according to embodiments of the present invention, may be a web site of Data Publisher. The returned data (HTTP, HTTPS or other suitable format) may be analyzed by the system. The User side cookies (e.g. cookies that were sent as a result of the request) may be isolated and identified. Cookies of a targeted User that were written by a Buyer without the consent of the respective Data Publisher (e.g., the site owner) may be defined as unauthorized or illegal cookies. Unauthorized cookies may be logged and trigger an alarm to the site owner and/or be viewed via the system's reports.

Reference is made now to FIG. 1, which is a schematic illustration of a distributed system 1 with a central management center, according to embodiments of the present invention. Distributed system 1 may comprise main controller 3 (e.g. one or more processors, central processing units, etc.) with a control station 3A together forming a central management service, one or more remote monitor 4A, 4B etc., one or more Data Publishers 5, one or more Data Buyers 6, such as ad-agencies and, according to some embodiments, one or more remote probes 8A, 8B etc. All the above may communicate with each other via network 2. Network 2 may be, according to some embodiments, a global network such the Internet. One or more of remote monitors 4A, 4B etc. may store on a storage device programs that when executed may initiate simulation or monitoring of calls of a User to a web site of a Data Publisher, and further may perform cookie identification. Additionally, one or more of remote monitors 4A, 4B etc or remote probes 8A, 8B etc., may further store on a storage device a cookies identification database usable for the identification of cookies received during the simulation and/or monitoring process.

One or more of remote monitors 4A, 4B etc or remote probes 8A, 8B etc. may communicate with main controller 3 for receiving missions, such as which sites should be monitored and what are the values of the monitoring parameters (such as schedule of invoking of a simulation process, what origin of the simulated User should be simulated, etc.). Main controller 3 may further send updates to remote monitors or remote probes (such as updates to cookies identification database). One or more of remote monitors 4A, 4B etc or remote probes 8A, 8B etc. may send to main controller 3 results of monitoring sessions, e.g. cookies which were identified as unauthorized cookies. Remote monitors 4A, 4B, etc. may be located in locations as may be required for simulating User calls from desired Internet protocol (IP) addresses (e.g., different geographical locations). Remote probes 8A, 8B etc. may be for example installed on user workstations in different geographical places. It is noted that the source and nature of each cookie can be identified and linked to a specific Buyer, by analyzing the cookie.

Figure 2:
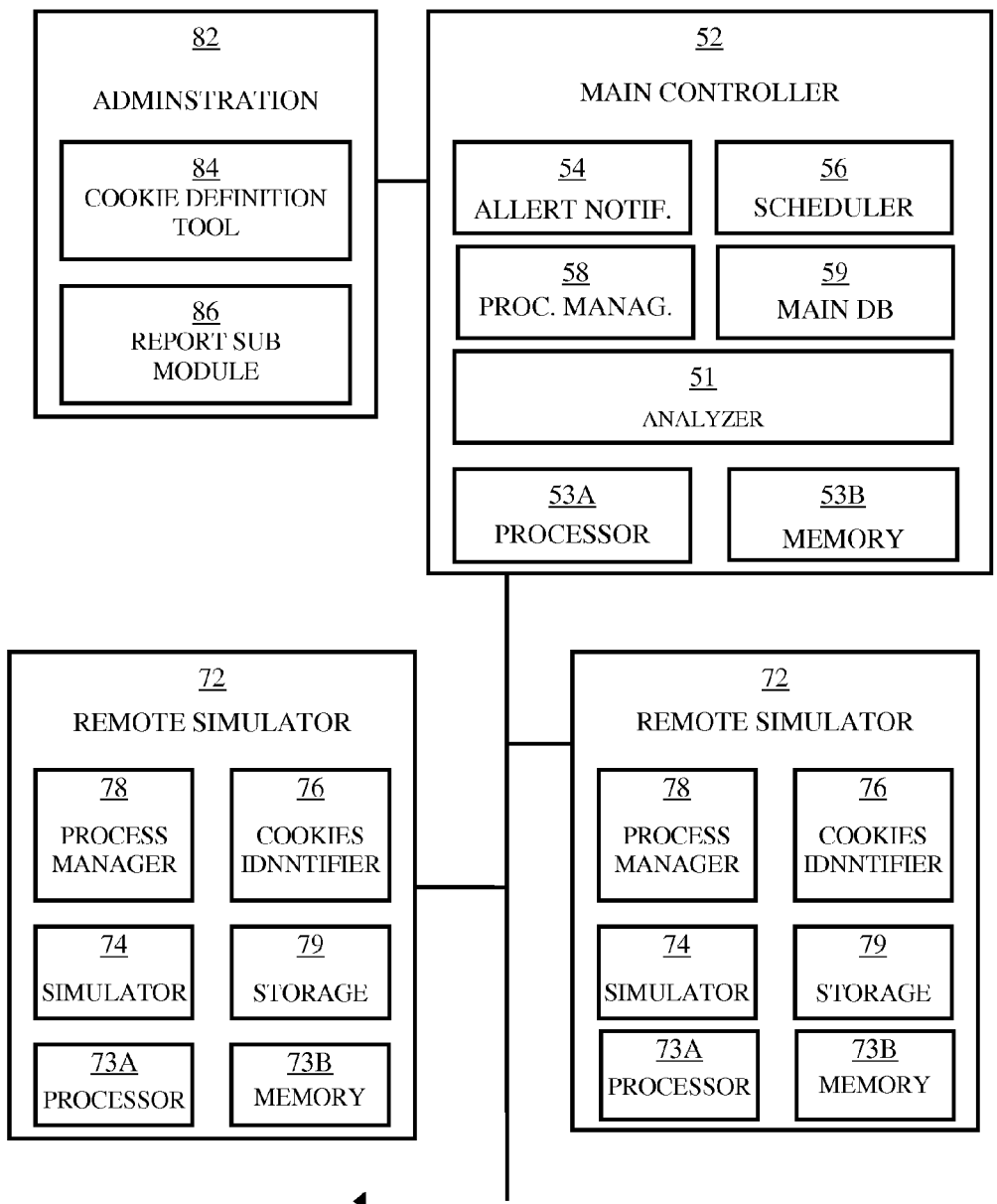
FIG. 2 is a schematic block diagram illustration of a simulation assembly for performing simulation of user's calls from various locations according to embodiments of the present invention.

Reference is made now to FIG. 2, which is a schematic block diagram illustration of a simulation assembly 10 for performing simulation of user's calls from various locations (e.g. various IP addresses associated with various geographical locations). Simulation assembly 10 may include main controller 52 and one or more remote simulators 72. Main controller 52 may comprise processor 53A (e.g. one or more processors, central processing units, etc.), memory 53B, analyzer module 51, alert notification module 54, missions scheduler module 56, process manager 58 and main database 59. Processor 53A may be any suitable processing device such a central processing unit (CPU), controller etc., specially designed or a general purpose processing unit. Memory 53B may any suitable memory such as read-only memories (ROMs), random access memories (RAM's), electrically programmable read-only memories (EPROMs), electrically erasable and programmable read only memories (EE-PROMs), FLASH memory and the like, Process manager 58 may be embodied as a Real-time management module which includes the following functionalities: trigger, administrate and monitor real time verification tasks; communicate with administration unit 82 to update main database 59 and perform the real time requests. Process manager 58 may issue reports which include test execution reports with the results as received from remote simulators 72; receive tasks requests from scheduler module 56 and call the relevant remote simulator 72 to perform a verification tasks; collect the test results from remote simulator 72, perform another set of processing using analyzer module 51 and update main database 59 with this information; and update data and configuration definitions of remote simulators 72 with the updated configuration and cookies identification data and rules, to improve the identification capabilities of remote simulator 72. The verification results received from remote simulators 72 may include the following information: tested site name, test date and time, list of located cookies including cookies' raw data, cookies' identification if exists, and indication of cookies which are suspected as non legal. It will be noted that according to other embodiments of the present invention scheduling modules may be included in one or more of remote simulators 72, to receive scheduled missions from process manager 52 and control their scheduled tasks. Mission scheduler module 56 is configured to store all service verification timing information and trigger the tasks operation requests to process manager 52. Main database 59 is configured to store both configuration information and activity results as received from remote simulators 72. Alert notification module 54 is responsible to alert the customers on non legal activity using the selected alert method (by using e-mail, SMS, and the like). Alert notification module 54 may receive notification events from process manager 58 (as reported from the remote proxy servers) and will administrate the alerts procedure. Analyzer module 51 may receive processing requests to additionally process information received from the remote simulator module 72, such processing my include additional analysis sessions to better identify suspected (e.g., unauthorized) cookies using information that was not available on the remote simulator sites during the testing sessions.

Modules 51, 53A, 53B, 54, 56, 58 and 59 may be embodied as separate units each with its own processor, storage device(s), etc. but may be embodied as modules in a single unit with a single processor or processors, single set of storage device(s), etc. According to some embodiments of the invention any other embodiment for realizing modules 51, 54, 56 and 58 may be utilized. Remote simulator 72 may include processor 73A (e.g. one or more processors, central processing units, etc.), memory 73B, simulator module 74, cookies identifier module 76, process manager 78 and storage device 79. Processor 73A may be any suitable processing device such a central processing unit (CPU), controller etc., specially designed or a general purpose processing unit. Memory 73B may any suitable memory such as read-only memories (ROMs), random access memories (RAM's), electrically programmable read-only memories (EPROMs), electrically erasable and programmable read only memories (EE-PROMs), FLASH memory and the like, Processor 73A may perform instructions stored, for example, in memory 73B to control the operation of simulator module 74, cookies identifier module 76, process manager 78 and storage device 79. Simulator module 74 may be configured to compose and send simulated load calls of web pages based on definable parameters or set(s) of rules. Cookies identifier module 76 may be configured to read, analyze and identify cookies received during loading of web pages. Process manager module 78 may be configured to control the simulation process and the cookies identification process. Storage device 79 may be used to store data received during the operation of simulator 72, such as web pages, cookies, web page loading history, etc. Modules 73A, 73B, 74, 76, 78 and 79 may be embodied as separate units each with its own processor, storage device, etc. but may be embodied as modules in a single unit with a single processor, single storage device, etc. According to some embodiments of the invention any other embodiment for realizing modules 73A, 73B, 74, 76, 78 and 79 may be utilized. According to some embodiments simulation assembly 10 may be controlled via administration unit 82, which may be located remotely from main controller 52, proximal to main controller 52 or included within main controller 52. Administration unit 82 may comprise cookies definition tool 84 and reports module 86. It will be noted that more then one process manager 52 may be used in simulation assembly 10 to improve the performance (such as cookie's identification time and cookie's identification accuracy) and stability.

According to some embodiments of the present invention an application running on a computer in system 10 may allow a user of the system, which may be for example customers or service administrators, to operate, to control and to monitor the operation of the system and information gathered and processed in or by the system. Reports sub module 86 may produce, provide or generate on-demand reports in response to requests initiated by the users. This sub module may be used for the automatic scheduled reports creation as well.

Additionally report sub module 86 may be configured to provide access to historical verification information. The reports can also be provided to an E-mail address on a pre-defined schedule. There may be several levels of reports, such as Detailed report for a defined period: list all verification and actual results received (including ad images, cookies, and so on); Summary report for a defined period: provide statistical information on the monitoring results.

Figure 2A:
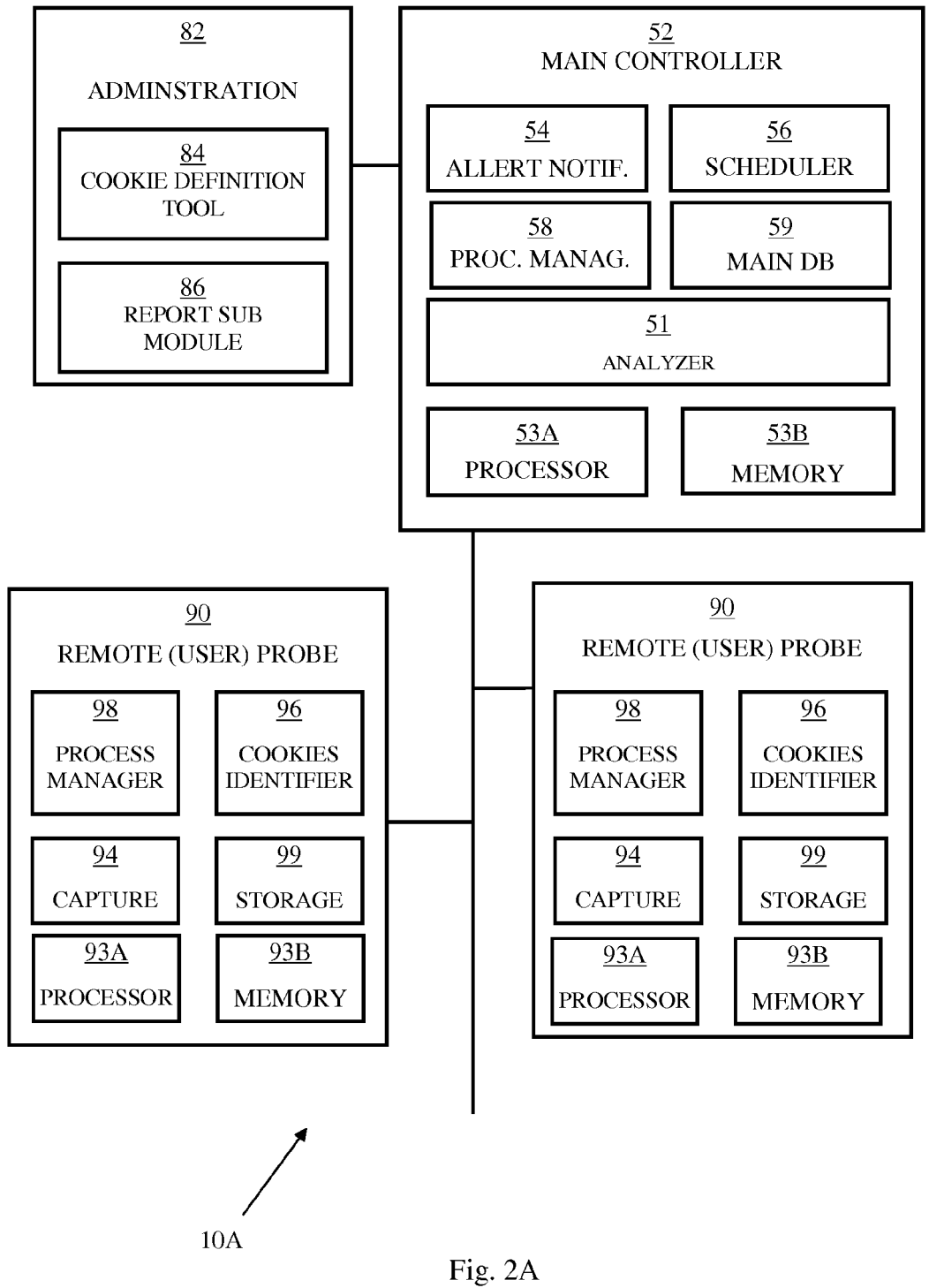
FIG. 2A is a schematic block diagram illustration of an assembly for monitoring user's calls from various locations according to embodiments of the present invention.

Reference is made now to FIG. 2A which is a schematic block diagram illustration of assembly 10A for performing monitoring of calls of user's from various locations according to some embodiments of the present invention. System 10A may include one or more user workstations acting as remote probes 90 and adapted to analyze and report certain types of data collectable at the user's site to main controller 52. The operation of main controller 52 and administration unit 82 are substantially the same as described above with respect to FIG. 2 with the necessary changes due to the fact that remote probe 90 may not operate as a simulator, as remote simulator does. Remote probe 92 may comprise processor 93A (e.g. one or more processors, central processing units, etc.), memory 93B, capture module 94, cookies identifier module 96, process manager 98 and storage device 99. Processor 93A may be any suitable processing device, similarly to the description of processor 73A, and may function in analogous manner. Memory 93B may be any suitable memory similarly to the description of memory 73B and may function in analogous manner. Capture module 94 may be configured to capture web pages loaded during the operation of remote probe 90. Cookies identifier module 96 may operate similarly to cookies identifier module 76. Process manager 98 may operate similarly to the operation of process manager 78. Storage device 99 may be used and operate similarly to storage device 79. Modules 93A, 93B, 94, 96, 98 and 99 may be embodied as separate units, each with its own processor, storage device, etc. but may be embodied as modules in a single unit with a single processor, single storage device, etc. According to some embodiments of the invention any other embodiment for realizing modules 94, 96, 98 and 99 may be utilized. According to some embodiments remote probe 90 may be realized by installation of a client agent at a user's device, however other embodiments may be applicable, as is known in the art. Different from remote simulator 72, remote probe 90 may not initiate simulations of calls for loading web sites. According to some embodiments remote probe 90 may be activated via a toolbar that may be installed during the installation of the client agent. This agent may be adapted to monitor web-related operations of the respective user, to analyze these operations and the data received during the operations, among other in view of data and parameters provided by main controller 52 and periodically or in response to request send the analyzed or raw data to main controller 52. It would be appreciated by those skilled in the art that an assembly according to some embodiments of the invention may comprise both remote simulator 72 (one or more) and remote probe 90 (one or more), where remote simulator(s) will operate according to the description of remote simulator 72 and remote probes will operate according to the description of remote probe 90.

Figure 3:
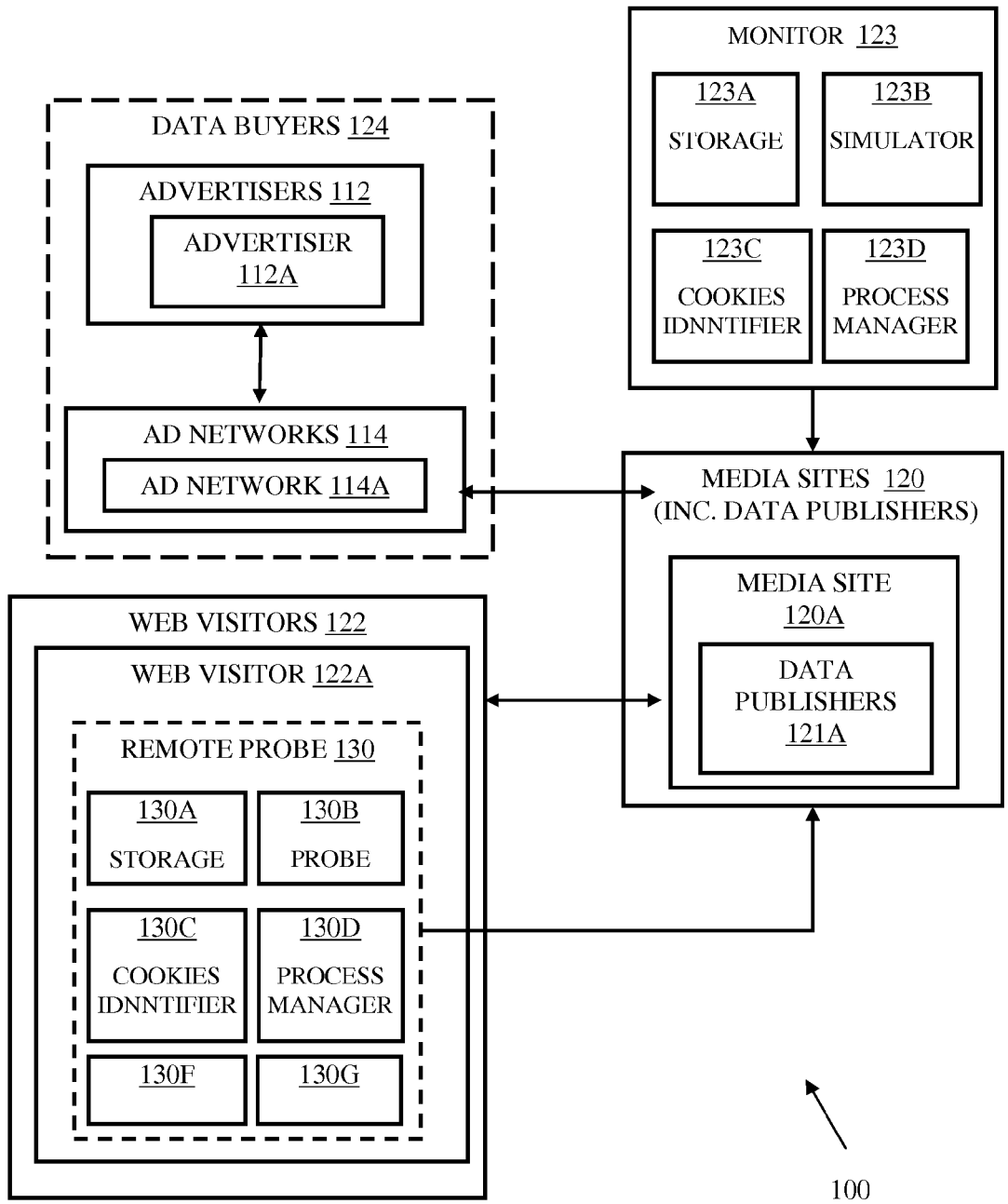
FIG. 3 is a schematic block diagram of members of a system according to embodiments of the present invention.

Reference is made now to FIG. 3, which is a schematic block diagram of members of system 100 according to some embodiments of the present invention. System 100 comprises data buyers group 124 which may comprise advertisers group 112 which comprises one or more advertisers 112A, 112B (not shown) etc., advertising networks 114 which comprises a plurality of advertising networks 114A, 114B (not shown) etc., and advertising agencies (not shown). System 100 further comprises web visitors group 122 which comprises a plurality of web visitors 122A, 122B (not shown) etc. and web visitors that optionally have probe 130 integrated into their environment. A web visitor is a network user using a web browser running on computer (or the like) and able to surf, or access, web sites, such as media sites 120. A web visitor's computer is equipped with storage device, such as hard disk, flash memory device and the like. Data may be saved on this storage device, for example temporary or permanent data, programs and Internet cookies. System 100 further includes web media sites group 120 which comprises a plurality of web media sites 120A, 120B (not shown), etc. Web visitors 122A, 122B etc. may visit one or more of media sites 120A, 120B etc. It will be noted that at least some of media sites 120A, 120B etc, are data publishers 121A, 121B (not shown) etc. Data publishers are web sites that tag the web visitors who access their web site and able to take advantage of this information by selling it to advertisers. Web visitor 122 that is equipped with remote probe 130 capability may monitor and optionally analyze and report activities of web visitor 122A. Remote probe 130 may comprise storage device 130A, probe application 130B, cookies identifier capability 130C, process manager 130D, processor 130F and memory 130G.

A network user, such as web visitor 122A, 122B, 130 whose cookies are written or modified as a result of a visit to data publisher 121A, 121B, will be denoted herein after as a "tagged user". The data written in these cookies may indicate data such as: this visitor has visited that web site once or more; whether this visit establishes compliance with one or more behavioral classifications as dictated by the details of a contract between data buyer and data publisher, etc. It will be noted that when data publisher 121A, 121B is engaged with more than one data buyer, the cookies for each data buyer are modified separately, according to parameters, data format and other features that may be dictated by each data buyer. Thus, a cookie written and stored in the storage device of a user that is associated with one data buyer may include indications of first group of trends, behavioral characteristics and possibly history of previous visits while a classifying cookie or cookies of a second data buyer may include indications of a second group of classifying characteristics.

In some embodiments of the present invention, the effecting of desired policy of writing/modifying cookies may be done by a software program that may be installed and running under the control of behavioral targeting module (not shown).

As seen in FIG. 3, web visitor 122A, 122B may be in active communication with, and may visit web sites 120A, 120B where some of them may be data publishers 121A, 121B. Web visitor 122A, 122B is in active communication with, and may visit media site 120A, 120B. Further, media sites group 120 may be in active communication with ad networks group 114. A visit of web visitor 122A, 122B to data publisher 121A, 121B may invoke writing of new cookie or cookies, or modifying of existing cookie or cookies in the storage device of web visitor 122A, 122B. Visit of web visitor 122A, 122B to media site 120A, 120B, may invoke loading of a requested web page and, when that web page includes instructions for loading of advertisement or advertisements that are provided by ad networks 114A, 114B. Ad network 114A, 114B may implement targeted advertising policy that reflects contracts it has with advertisers 112A, 112B. For implementing this contract, policy cookies of web visitor 122A, 122B are browsed by ad networks 114A, 114B and according to the information and classifications in them ad network 114A, 114B may send selected advertisements to web visitor 122A, 122B. It will be noted that other cookies, inventories and considerations may affect the advertisement content being presented to the user.

System 100 may include one or more monitor services 123 which comprise storage device 123A, simulator module 123B, cookies identifier module 123C and process manager 123D. Cookies may be written, stored and modified in and read from storage device 123A. Monitor services 123 may be located in several geographical locations. Monitor services 123 may be embodied as a program running on a dedicated computer, or on a computer running also other programs, or on a server or servers connected to system 100, or the like. Monitor services 123 may be in active communication with media sites 120A, 120B which include one or more data publishers 121A, 121B. Monitor service 123 is adapted to simulate web visitors 122A, 122B by appearing in system 100 as a certain web visitor, having controllable characteristics, at any given time. Monitor service 123 is adapted to emulate said certain web visitor using different characterizing situations and parameters of said certain web visitor, such as web visitor 122A, 122B who visits media site 120A, 120B without previously visiting data publisher 121A, 121B, after visiting data publisher 121A, 121B one time, after visiting data publisher 121A, 121B two times, etc. Emulation of a web visitor visiting data publisher 121A, 121B a variable number of times before monitor service 123 emulates a visit to media site 120A, 120B may effect the content of a cookie indicative of the history of visits of said web visitor and thus effect analyses of said emulated visits, as is discussed in details below. Monitor service 123 may emulate one of a plurality of web visitors, as may be required. Monitor service 123 is further adapted to invoke controlled visits to monitored data publishers 121A, 121B and to a controlled list of media sites 120A, 120B. Said controlled visits to monitored data publishers 121A, 121B and to the list of media sites 120A, 120B may be in a controlled order. Further, the time frame within which the emulated visits of web visitor 122A, 122B to media sites 120A, 120B in the various configurations relative to visiting data publisher 121A, 121B described above, and the controlled list of media sites 120A, 120B. Said controlled visits to monitored data publishers 121A, 121B and the list of media sites 120A, 120B may be controlled, for example to have a definable value. It would be appreciated by those skilled in the art that the characteristics of this time frame may have an implication on the meaning of tests performed according to some embodiments of the present invention, as will be described in more details below. Monitor service 123 is further adapted to collect and analyze cookies received during browsing into data publishers site 121A, 121B.

A set of tests may be defined to check and verify whether an illegal or unauthorized modification to cookies was performed. Those tests will check whether there are cookies of a web visitor, such as web visitor 122A, 122B, emulated by simulator service 123, that may be identified as been created and/or modified by a data buyer, such as advertiser 112A, 112B or ad network 114A, 114B in cases where web visitor 122A, 122B could have been directed to these data buyers by a data publisher, such as data publisher 121A, 121B. The verification may be done using cookies identifier module such as module 76 and process manager 78 (FIG. 2).

Those tests may be performed by invoking a plurality of web visitors' accessing data publishers 121A, 121B and media sites 120A, 120B, according to sets of test parameters. These test parameters may include geographical related information (such as origin country, simulated by using IP address belonging to the simulated origin country), time-of-day, day-of-week, number of visits to be emulated in targeted and in non-data publishers, scheduling of the visits—how often and when, flow of the order of visits (e.g. whether the emulated visitor previously visited data publisher site once or more, and how often, etc.), the type of browser and the like.

A testing scenario may be defined as a set of testing parameters having each a certain value. A testing scenario may include one or more visits to data publishers 121A, 121B and/or media sites 120A, 120B. Thus, two different testing scenarios may differ from each other by having at least one parameter with different value in each. A testing session may be defined as a set of testing scenarios performed with a certain set of parameters. A single test may include one or more test sessions with optionally with varying parameter values.

User simulation can be carried out by a dedicated application executed as part of a simulator, such as remote simulator server 72 (FIG. 2). This application may use TCP/IP protocol to initiate a user HTTP/HTTPS request that will emulate a standard web browser request accessing a web server.

In embodiments where system 100 comprises of web visitor equipped with probe 130 capability (not shown), during the browsing session probe 130 may control its operation by a process manager (not shown) to analyze and identify cookies by a cookies identifier (not shown) and store in storage device (not shown data related to identification of cookies and of identified cookies, as well as of browsing history, similarly to the operation of monitor service 123 described above, with the necessary changes.

Figure 4:
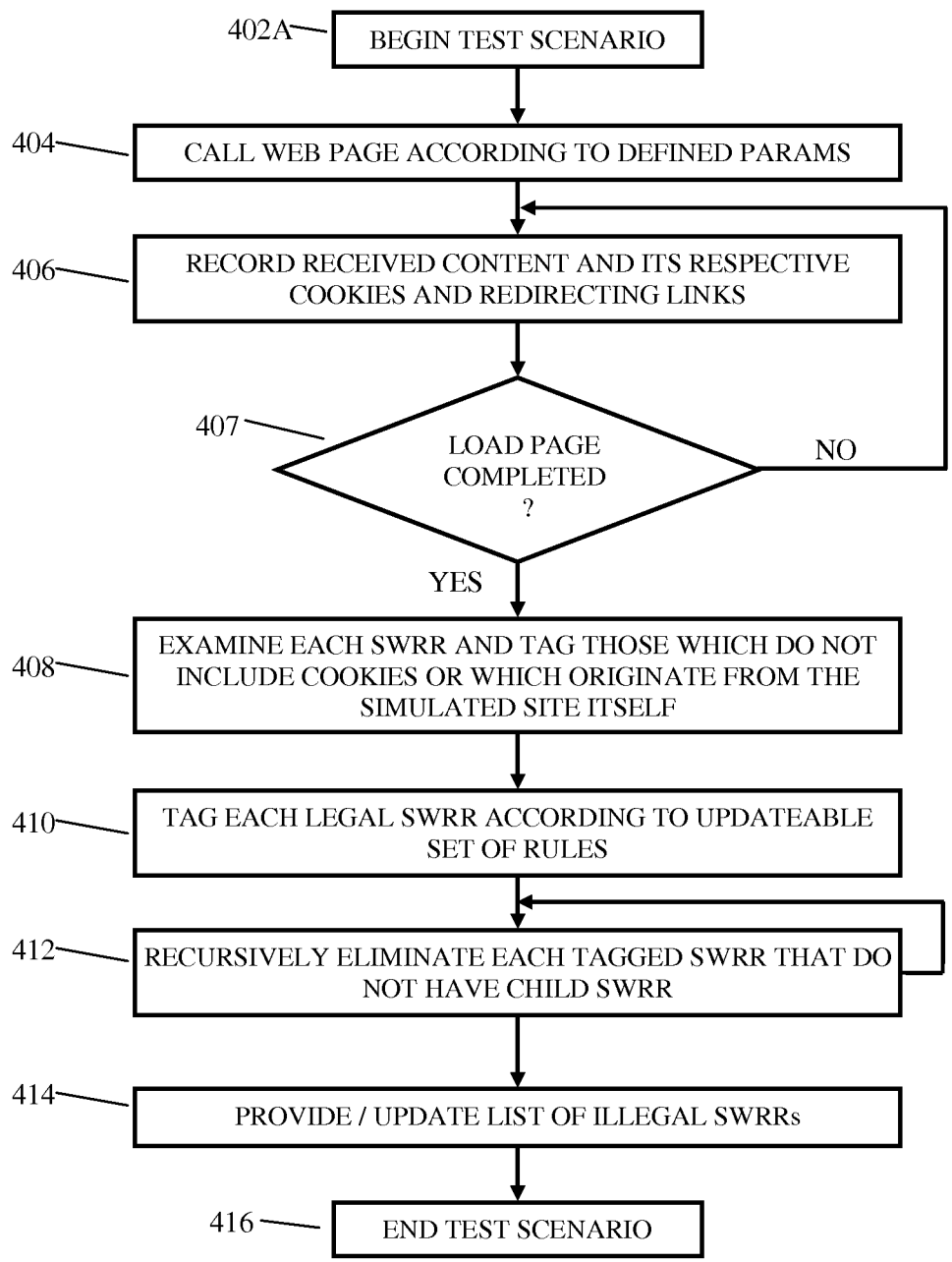
FIGS. 4 and 4A are schematic flow diagrams of processes for identifying illegal cookies using simulation or probe monitoring, respectively, according to embodiments of the present invention.
Figure 4A:
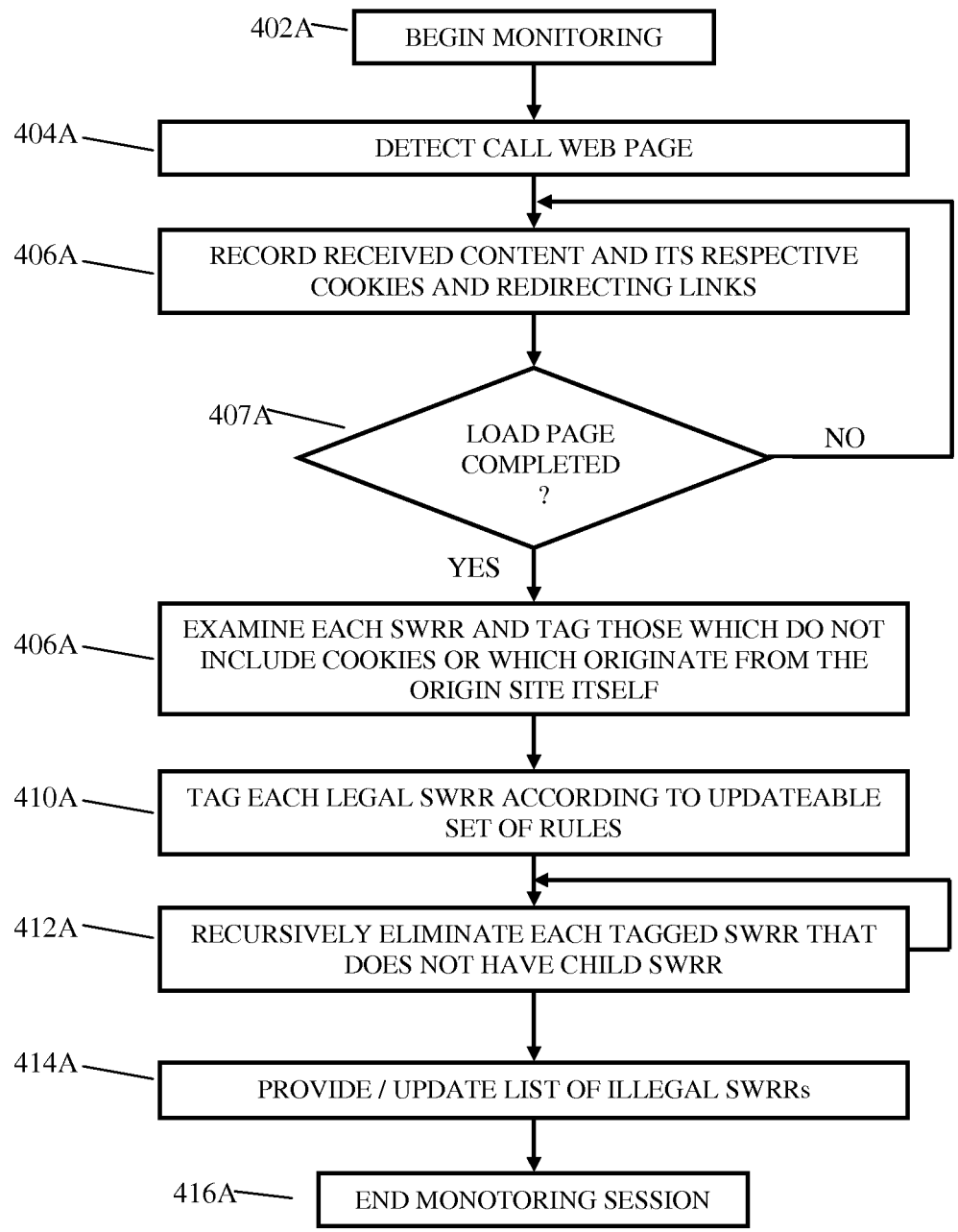

Reference is made now to FIGS. 4 and 4A, which are schematic flow diagrams of processes for identifying illegal or unauthorized cookies using simulation or probe monitoring, respectively, according to some embodiments of the present invention. The description that follows refers to a process for identifying illegal or unauthorized cookies using simulation as depicted in FIG. 4, however it will be appreciated by those skilled in the art that similar description with the necessary changes, as depicted in FIG. 4A (and where the respective block numbers are annotated with "A") may be used to describe process for identifying illegal or unauthorized cookies by monitoring activity of a user's web site. A process for identifying illegal cookies may begin (block 402) by a web user simulator, such as remote simulator 72 (FIG. 2), with the issuance of a call for a web page according to pre-defined set of parameters (404). Such parameters may be: time of initiation of the test, origin of the call and history of the simulated user with respect to the specific simulated call (e.g. what is the frequency of previous calls to same/similar web sites), etc. At least one of the parameters may be defined by a user of a system according to some embodiments of the invention. In response to the initiated call a simulated web request record (SWRR) may be created. A SWRR may include the HTTP/HTTPS request itself along with the received content, with its respective cookies (if any) and with a list of derived SWRRs (block 406). A derived SWRR is an element that was detected during the processing of the content of the respective parent SWRR. This process may be repeated as long as the loading of the called web page has not ended. When the loading of the called web page ends (block 407, YES) the collection of the SWRRs identified in block 406 are recursively examined and those SWRRs which are assumed as legal are tagged (block 408). Such SWRRs which are assumed as legal may be those which do not include cookies or which originate from the simulated site itself. In block 410 SWRRs which were not tagged in block 408 are further examined according to an updateable set of rules, at the end of this stage the SWRRs which are identified as legal are tagged. The updateable set of rules may be updated from time to time by main controller 52 (FIG. 2). In block 412 repeatedly each tagged SWRR which do not have child SWRR is eliminated.

The resulting list includes SWRRs suspected as illegal. This list is provided to main controller 52 for further analysis (block 414).

Figure 5:
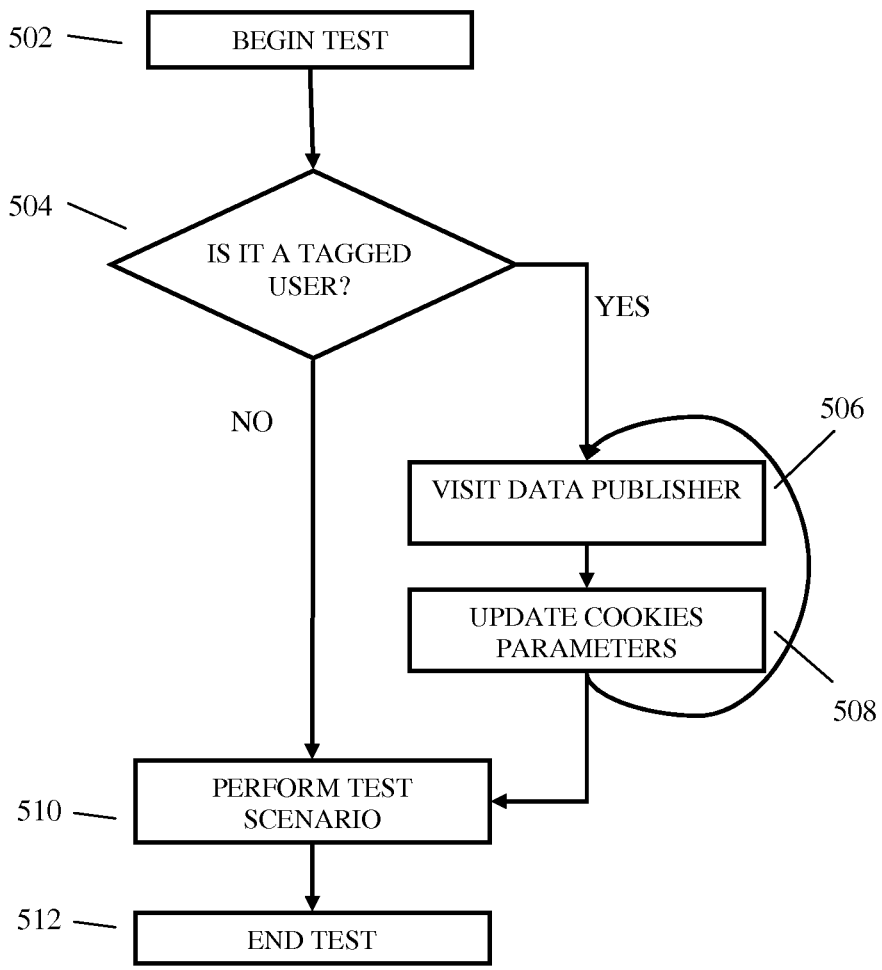
FIG. 5 is a schematic flow diagram describing performing of a single test session with definition of history of visits of a simulated or monitored user, according to embodiments of the present invention.

Reference is made now to FIG. 5, which is a schematic flow diagram describing performing of a single test session with definition of history of visits of a simulated user, according to some embodiments of the present invention. A test according to this test session begins in block 502. In case this is a tagged simulated user, i.e. a user that is simulated as if it visited the web site that will be visited in this test previously, blocks 506 and 508 are performed number of times equal to the number of the simulated previous visits, according to the definitions of the simulation, prior to the performing of block 510. If the simulated user is not a tagged user, that is this simulated user does not have history of previous visits to the web site that will be visited, block 510 is performed immediately after block 504. Block 510 represents the performance of a single test, as described above in the previous paragraph.

Figure 6:
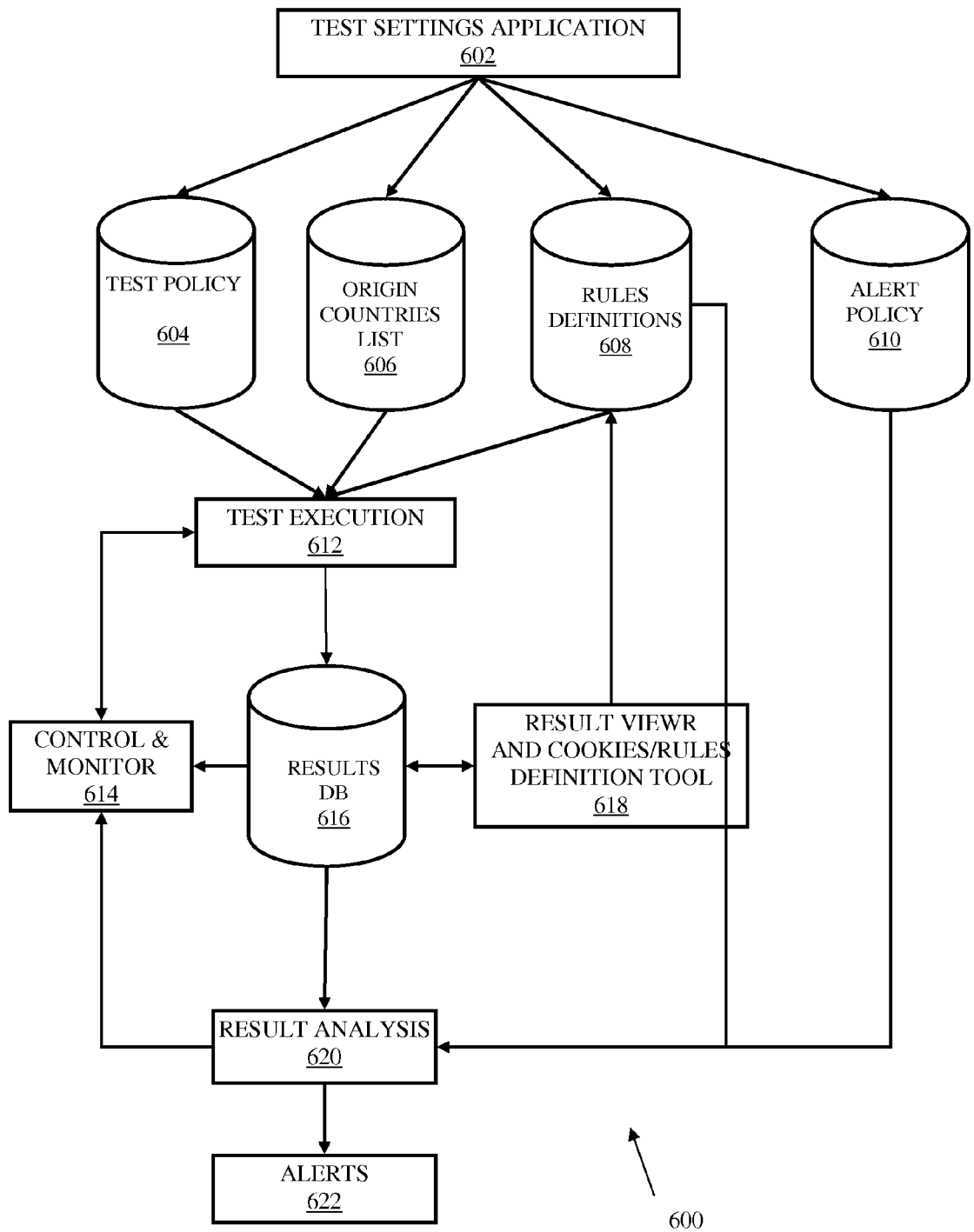
FIG. 6 is a schematic block diagram illustrating an optional embodiment of the system of FIG. 2 or FIG. 2A according to embodiments of the present invention.

Reference is made now to FIG. 6, which is a schematic block diagram illustrating sub-system 600 being an optional embodiment of system 10 (FIG. 2) according to some embodiments of the present invention. Sub-system 600 comprising test setting application 602 allowing a user to define or set one or more tests that will be used to check the presence of illegal cookies potentially indicative of illegal writing or changing of cookies content. When using test setting application 602 a user may define the following parameters. A first set of parameters is a site-specific set of rules related to host sites and cookies structures being legal for the tested site. A second set of parameters may include non site-dependant but structure-dependant rules which are used to identify suspicious or unauthorized cookies. A third set of rules may include execution-related parameters such as time of performing the test, geographical origin of the test, history of the tested sites, etc. A fourth set of parameters may include the definition of the alert boundaries that will be used to trigger an alert to the user on exceeding certain limitation during the analysis stage; and alerting messaging policy defining who should be alerted, via what alerting channel (such as short messaging system (SMS), e-mail etc.), etc.

Test execution module 612 establishes and executes test sessions and test scenarios, as detailed above with respect to FIG. 5, from block 504 to block 510. As part of its operation, test execution module 612 stores the collected updates as a list of illegal cookies (as described with respect to block 414 of FIG. 4) in results database (DB) 616. It will be noted that module 612 may execute multiple tests, test scenarios and test sessions in parallel (using one or more remote simulators as described earlier). Result viewer 618 allows the user to review the links and cookies associated with a selected content of a selected web page and manually identify the origin of a modification made illegally to a cookie. In additional to viewer capabilities, module 618 may allow the user to add/edit cookie definition and identification rule that will be stored in the rules definition database 608 and will be used in the future test controlled by the test execution module 612.

Result analysis module 620 may analyze received lists of illegal cookies according to a definable set of rules and may perform additional identifications tests, for example by re-examining data related to cookies that was received and examined previously. Result analysis module 620 may compare the result data with the definitions of alert policy executed in block 622 and may issue alerts accordingly.

Alerts module 622 may dispatch alerts to the user according to definitions that were pre-stored in it.

Control and monitor module 614 may allow the user to monitor and control the execution of the tests including stopping or suspending the test process, monitoring of the actual execution of the test process, view issued alerts and initiate an on-demand tests.

The various functionalities and operations of the modules of sub-system 600 may be executed on one or more computers or servers which may be located in different physical locations which may be spaced apart. Similarly, the storage of the various data entities may be on one or more storage mediums using one or more computers or servers, which may be located in different physical locations and may be spaced apart.

As part of HTTP returned data, cookies included in the HTTP header can be isolated and analyzed according to their origin site and the structure of the data contained in the cookies. The Origin site of a cookie is the web site that provided that cookie. It will be noted that as part of the response to HTTP request, some parts of the loaded page may originate from different servers, different web sites and the like, which may, in general, be provided by other content providers or advertising agencies who provide content to be presented in certain areas of the loaded WEB page.

Each cookie is formed as a dedicated data item that is meant to be used in a later stage by its originating server application owner. Different origin sites may have different cookies structures, and the different cookies may be used for different purposes. For example, the following example of three different cookies were provided by some data exchange servers:

| Sample ID | Cookie content/format |
|---|---|
| Sample 1 | BX |
| | arbs3up5kpo5u&b=3&s=pi |
| | sitename.com/ |
| | 1024 |
| | 342532096 |
| | 32065574 |
| | 4155647280 |
| | 30053320 |
| Sample 2 | __utma |
| | 71378375.703314262.1263329473.1263329473.1263329473.1 |
| | sitename.com/ |
| | 1088 |
| | 3941392384 |
| | 30200171 |
| | 4191587280 |
| | 30053320 |
| Sample 3 | __utmz |
| | 71378375.1263329473.1.1.utmccn=(direct)|utmcsr=(direct)|utmcmd=(none) |

| Sample ID | Cookie content/format |
|---|---|
| | sitename.com/<br>1088<br>3049439232<br>30090033<br>4192057280<br>30053320 |

To identify and isolate specific cookie's parameters the number of lines in the cookie and the line content expression type (such as <number>.<number> . . . and the like) may be used or relied upon. In some cases standard regular expressions may be used to describe/identify the content of a line in a cookie data item. In some cookies data structures there may be used a descriptive text that may describe some of the meaning of data elements in that cookie.

Cookie definition tool, such as cookie definition tool 84 (FIG. 2) can enable the system operator to add/edit cookie identification data. Using this tool the operators can add identification records that will be sent to the remote identification databases, to assist in analyzing received and cookies categorization.

For example, given the following cookie data:

```
utmz
71378375.1263329473.1.1.utmccn=(direct)|utmcsr=(direct)|utmcmd=(none)
sitename.com/
1088
3049439232
30090033
4192057280
30053320
```

The above cookie data can be described by the following rule set:

```
8 rows
Row 1 - text, equal to "_utmz"
Row 2 - include "utmccn" and "direct"
Row 3 - equal to "sitename.com/
Row 4 - number
``` and so on. Composing and maintaining such rules sets may be of value in the process of analysis of cookies. This will be made using the cookies definition tool 618 (FIG. 6) as part of the result viewing stage. As part of this process, the user is able to 'tune' the system definitions and settings to better detect and identify unauthorized or illegal cookies.

A site depended 'white list' may be administered. This may include documentation of all 'legal' (authorized) cookies and sites that should not be identified as unauthorized sites (prevent false alerts). A white list can have a date stamp, e.g. the stamped cookie is legal until a certain date. The data and definitions of the white list will be kept in the main database 59 (FIG. 2) and will be populated to the remote simulator 72 (FIG. 2) to allow the process manager 78 (FIG. 2) using this information when identifying illegal SWRR as part of stage 408 (FIG. 4)

Any cookie that could not be identified by a system according to some embodiments of the present invention may be treated as or illegal cookie. The system will allow later 'manual' analysis using the result viewer and cookies definitions tool 618 (FIG. 2).

A system constructed and operating according to some embodiments of the present invention may provide an administration interface for the Data Publishers (customers of the service) and for the System operators. Using this interface, the following services may be available:

1. Monitored site definition
2. Set alert notifications
3. Report access (including automatic reports)

The definition of a monitored site (data publisher site) may include general settings of the service, such as:

1. Setting the main URL
2. Testing frequency and timing—how often the verification will be performed, hours/days and time period for the tests execution.
3. Emulating Origin—enable/disable each available country/region proxy server
4. Providing white list definitions A system constructed and operating according to some embodiments of the present invention may provide real time notifications settings may contain detailed information of the illegal activity. The notifications can be sent via e-mails or SMS or the like and may include the following information (note that in some cases, partial information will be available for a certain alert):

1. Date/Time
2. Site element that triggered the creation of the cookie. E.g. if it's an ad then the ad creative (Image).
3. Buyer name/site
4. Related/associated companies or advertisers
5. Full Cookie text (to allow later a more detailed analysis)

A system constructed and operating according to some embodiments of the present invention may provide access to historical verification information. Reports of the system may also be provided to an E-mail address on a predefined schedule. There may be several levels of reports, such as:

1. Detailed report—for a defined period: list all verification and actual results received (including ad images, cookies, and so on).
2. Summary report—for a defined period: provide statistical information on the monitoring results.

A system constructed and operating according to some embodiments of the present invention may provide the ability to define automatic reporting policy, which may trigger automatic predefined reports to be sent via e-mail to the target user.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. In a network comprising plurality of web sites and at least one simulator a method comprising:
   calling a web page by simulating a web browser page call;
   identifying, using a processor, in received content and cookies if a cookie which is used to store behavioral related information was written by an unauthorized entity,
      the identifying further comprising identifying that the cookie is an illegal cookie based on a number of lines in the cookies and from a structure of data contained in the received cookies,
         wherein the structure is an arrangement of the data, said cookie written by an unauthorized entity being the illegal cookie.

2. In a network comprising plurality of web sites and at least one simulator a method comprising:
   a. calling a web page according to definable set of parameters by simulating a web browser page call;
   b. identifying, using a processor, in received cookies according to a first definable set of rules a cookie which is used to store behavioral related information and that was written by unauthorized entity,
      wherein the rules include a rule specifying a first structure of data,
      the identifying further comprising identifying that the cookie is an illegal cookie based on a number of lines in the cookie and from a applying the rule specifying the first structure of data to a second structure of data contained in the received cookies,
         wherein the first structure and second structure are arrangements of the data, said cookie being the illegal cookie;
   c. identifying, using the processor, in received content elements which have to be loaded separately, and
   d. for each separately loaded content element repeating steps a-d recursively.

3. The method of claim 2 comprising issuing an alert when the illegal cookie is identified.

4. The method of claim 3, wherein said issuing of said alert is performed according to definable alerting method and frequency.

5. The method of claim 2 comprising using plurality of simulators located in different geographical locations.

6. The method of claim 5, the network comprising main controller, said main controller:
   coordinating the operation of said plurality of simulators;
   collecting information indicative of identified illegal cookies;
   collecting from said simulators web page calls and respective content and cookies; and
   updating said definable set of parameters and said first definable set of rules.

7. The method of claim 6, comprising identifying illegal cookies according to second set of rules.

8. The method of claim 2, wherein identification of unauthorized entities is responsive to a predefined list of permitted web sites, said list is a white list.

9. The method of claim 2, wherein said calling is performed according to predefined scheduling and frequency parameters.

10. The method of claim 2, wherein said definable set of parameters and said definable set of rules is set by a user.

11. A system comprising:
    a network;
    plurality of servers providing web sites; and
    at least one simulator,
    wherein said simulator is adapted to:
       a. call a web page according to definable set of parameters by simulating a web browser page call;
       b. identify in received cookies according to a first definable set of rules a cookie which is used to store behavioral related information and that was written by unauthorized entity,
          the identifying further comprising identifying that the cookie is an illegal cookie based on a number of lines in the cookie and a web site that created or modified the cookie, said cookie is the illegal cookie;
       c. identify in received content elements which have to be loaded separately, and
       d. for each separately loaded content element repeating steps a-d recursively.

12. The system of claim 11 wherein the simulator is adapted to issue an alert when the illegal cookie is identified.

13. The system of claim 11 comprising plurality of simulators located in different geographical locations.

14. The system of claim 11 wherein the network comprises a main controller, said main controller adapted to:
    coordinate the operation of said plurality of simulators;
    collect information indicative of identified illegal cookies;
    collect from said simulators web page calls and respective content and cookies; and
    update said definable set of parameters and said first definable set of rules.

15. The system of claim 14 wherein said main controller comprising analyzer to analyze illegal cookies based on a second set of parameters.

16. The system of claim 11 comprising a list of permitted web.

17. The system of claim 11 wherein said at least one simulator comprises a process manager to control scheduling of said web page calls.

18. The system of claim 11 comprising alert notification unit to issue alerts when the illegal cookie is identified according to alert policy.

19. In a network comprising plurality of web sites and at least one user acting as a probe a method comprising:
    a. said probe calling a web page;
    b. identifying, using a processor, in received cookies according to a first definable set of rules a cookie which is used to store behavioral related information and that was written by unauthorized entity,
       the identifying further comprising identifying that the cookie is an illegal cookie based on a number of lines in the cookie and the web site that created or modified the cookie, said cookie is an illegal cookie;
    c. identifying, using the processor, in received content elements which have to be loaded separately, and
    d. for each separately loaded content element repeating steps a-d recursively.

* * * * *